US012705457B2

(12) United States Patent
Chilkuri et al.

(10) Patent No.: US 12,705,457 B2
(45) Date of Patent: Aug. 11, 2026

(54) METHODS AND SYSTEMS FOR PARALLELIZING COMPUTATIONS IN RECURRENTLY CONNECTED ARTIFICIAL NEURAL NETWORKS

(71) Applicant: Applied Brain Research Inc., Waterloo (CA)

(72) Inventors: Narsimha Chilkuri, Waterloo (CA); Christopher David Eliasmith, Waterloo (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 659 days.

(21) Appl. No.: 18/029,917

(22) PCT Filed: Oct. 1, 2021

(86) PCT No.: PCT/CA2021/051374
§ 371 (c)(1),
(2) Date: Apr. 2, 2023

(87) PCT Pub. No.: WO2022/067444
PCT Pub. Date: Apr. 7, 2022

(65) Prior Publication Data

US 2023/0359861 A1 Nov. 9, 2023

Related U.S. Application Data

(60) Provisional application No. 63/087,100, filed on Oct. 2, 2020.

(51) Int. Cl.
*G06N 3/044* (2023.01)
*G06N 3/084* (2023.01)

(52) U.S. Cl.
CPC ............. *G06N 3/044* (2023.01); *G06N 3/084* (2013.01)

(58) Field of Classification Search
None
See application file for complete search history.

(56) References Cited

U.S. PATENT DOCUMENTS 9,015,093 B1 4/2015 Commons
2017/0249547 A1 8/2017 Shrikumar et al.

FOREIGN PATENT DOCUMENTS

WO WO-2017095948 A1 * 6/2017 ............... G06N 5/04
WO WO-2018085722 A1 * 5/2018 ............. G06N 3/044
WO 2019079166 A1 4/2019

OTHER PUBLICATIONS

Chilkuri et al. ("Parallelizing Legendre Memory Unit Training" ICML 2021, arXiv: 2102.11417v2, May 10, 2021) (Year: 2021).*

(Continued)

*Primary Examiner* — Olabode Akintola

(74) *Attorney, Agent, or Firm* — Jenna L. Wilson; Wilson Lue LLP (firm)

(57) ABSTRACT

The present invention relates to methods and systems for improving the training and inference speed of recurrently connected artificial neural networks by parallelizing application of one or more network layer's recurrent connection weights across all items in the layer's input sequence. More specifically, the present invention specifies methods and systems for carrying out this parallelization for any recurrent network layer that implements a linear time-invariant (LTI) dynamical system. The method of parallelization involves first computing the impulse response of a recurrent layer, and then convolving this impulse response with all items in the layer's input sequence, thereby producing all of the layer's outputs simultaneously. Systems com-posed of one or more parallelized linear recurrent layers and one or more nonlinear layers are then operated to perform pattern classification, signal processing, data representation, or data generation tasks.

20 Claims, 2 Drawing Sheets

(56) References Cited

OTHER PUBLICATIONS

Martin et al. ("Parallelizing Linear Recurrent Neural Nets Sequence Length" ICLR 2018, arXiv: 1709.04057v2, Feb. 22, 2018) (Year: 2018).*
Office Action dated Apr. 22, 2024 received in Indian Patent Application No. 202347029448, 8 pgs.
Extended European Search Report dated Oct. 8, 2024 received in EP 21873778.1, 13 pgs.
Chilkuri, N. R., & Eliasmith, C. (Jul. 2021). Parallelizing Legendre memory unit training. In International Conference on Machine Learning (pp. 1898-1907). PMLR.
Anonymous: "nengo / keras-lmu / lmu / lmu.py at commit, 74bcbe616b4987fbde5c9ea685778ad19c07b9a0", Aug. 20, 2020 (Aug. 20, 2020), XP093208195, Retrieved from the Internet: URL:https://github.com/nengo/keras-Imu/blob/74bcbe616b4987fbde5c9ea685778ad19c07b9a0/lmu/lmu.py, 25 pgs. [retrieved on Sep. 24, 2024].
Anonymous: "Solving the Permuted Sequential MNIST (psMNIST) Task@ commit, 74bcbe616b4987fbde5c9ea685778ad19c07b9a0", Aug. 20, 2020 (Aug. 20, 2020), XP093208458, Retrieved from the Internet: URL:https://github.com/nengo/keras-lmu/blob/74bcbe616b4987fbde5c9ea685778ad19c07b9a0/docs/examples/psMNIST.ipynb, 4 pgs. [retrieved on Sep. 25, 2024].
Office Action dated Aug. 27, 2024 received in Canadian Patent Application No. 3194614, 4 pgs.
International Search Report dated Nov. 18, 2021 from PCT/CA2021/051374.
Written Opinion dated Nov. 18, 2021 from PCT/CA2021/051374.
Martin et al., "Parallelizing Linear Recurrent Neural Nets Over Sequence Length". ICLR 2018, Feb. 22, 2018 (Feb. 22, 2018), pp. 1-9, [ online] [retrieved on Nov. 16, 2021 (Nov. 16, 2021)]. Retrieved from the Internet: <arXiv:1709.04057v2 [cs.NE]>.
Office Action dated Jul. 1, 2025 from Japanese Patent Application No. 2023-520035, pp. 1-5.
Voelker, Aaron et al., "Legendre Memory Units: Continuous-Time Representation in Recurrent Neural Networks", 33rd Conference on Neural Information Processing Systems (NeurIPS 2019), [online], 2019, [retrieved on Jun. 25, 2025], Retrieved from <https://compneuro.uwaterloo.ca/files/publications/voelker.2019.lmu.pdf>, pp. 1-5.
Anonymous: "Feedforward Legendre Memory Units", OpenReview.net, [online], Sep. 29, 2020, [retrieved on Jun. 25, 2025], Retrieved from <https://openreview.net/forum?id=qkJevgi2Fp3>, pp. 1-10.
Office Action dated Mar. 27, 2025 received in CN202180066021.1, 3 pgs.
Office Action dated Jun. 25, 2025 received in IL301423, 3 pgs.

* cited by examiner

METHODS AND SYSTEMS FOR PARALLELIZING COMPUTATIONS IN RECURRENTLY CONNECTED ARTIFICIAL NEURAL NETWORKS

(1) FIELD OF THE INVENTION

The present invention generally relates to the field of processing temporal data with recurrently connected artificial neural networks, and more specifically to improving the efficiency of these networks by parallelizing the sequential state updates that must be computed during both model training and model deployment.

(2) BACKGROUND OF THE INVENTION

A standard task performed by modern machine learning systems involves generating one or more output predictions from a time-varying sequence of input data. For example, systems that perform automatic speech recognition take in a sequence of samples from an audio waveform of some duration, and predict a sequence of discrete output labels corresponding to the words spoken in the audio waveform. Systems that perform natural language processing similarly map input sequences (e.g., the words in a newspaper article) to output labels (e.g., the topic of the article). One of the most common techniques for building machine learning systems that process sequential data involves first defining an artificial neural network with a set of recurrently connected weights, and then repeatedly applying these weights to update the state of the network as each item in an input sequence is processed. Because the same recurrent weights are applied each time a new input is presented, such a network can in theory process an indefinitely long sequence of data while using a fixed number of model parameters. In practice, recurrent neural networks (RNNs) are one of the most effective machine learning tools available for modeling time-varying data.

Many of the most important recent advances in machine learning have come from training large-scale models on enormous amounts of data. A key enabler of these advances has been the use of graphics processing units (GPUs) to accelerate the computations required to perform model training and model inference by parallelizing them across large numbers of relatively simple processing cores. However, because RNNs process information in an inherently sequential manner, it is not straightforward to parallelize the computations they perform and thereby take full advantage of GPU-based acceleration. Efforts to train models at scale while working around this sequential bottleneck in RNNs has led to a number of novel neural network systems for processing sequential data being defined in prior art. As such, the following documents and patents are provided for their supportive teachings and are all incorporated by reference: https://arxiv.org/pdf/1709.04057.pdf discusses a method for parallizing linear RNN computations over an input sequence by employing a parallel scan algorithm that can be distributed over multiple computing cores within a single GPU. Importantly, this method only works for recurrent connections that implement element-wise multiplications (i.e., the weight matrices for the connections in question must be diagonal), which substantially restricts the class of the models it can be used to train.

Another prior art document, https://arxiv.org/pdf/1610.10099.pdf, describes methods for training networks to process sequential data at scale by using easily parallelizable convolutional connections rather than recurrent connections. These methods produce networks that run in linear time with respect to sequence length and achieve strong results on standard sequence modelling tasks such as machine translation. However, a drawback of these methods is that they produce networks that cannot be easily applied to streaming data once fully trained, since they require that an input signal be buffered and provided in its entirety before any processing can take place. Such buffering can be prohibitively costly in problem domains that involve extremely long input sequences, and RNN architectures have the important advantage of supporting streaming updates wherein the network processes each incremental input upon arrival.

A further prior art document, https://arxiv.org/pdf/1706.03762.pdf, describes methods for training neural networks to process sequential data at scale by using purely feedforward "transformer" network architectures that make use of an attention mechanism to model relationships between different sequence elements. Transformers are implemented via large numbers of dense matrix multiplications that are almost perfectly suited to GPU-based parallelization, and it is accordingly possible to train them on massive amounts of data. This scalability, in tandem with the effectiveness of attention mechanisms for learning long-range data dependencies, has led transformer-based architectures to become the state-of-the-art for many sequence modelling tasks, especially in the domain of natural language processing. As with convolutional neural networks, however, transformers are not naturally suited to operating on streaming inputs. Additionally, these networks often require vast numbers of parameters to achieve good task performance, and operate with a quadratic rather than linear running time with respect to input sequence length.

On the topic of efficient RNN algorithms, prior art document http://compneuro.uwaterloo.ca/files/publications/voelker.2019.lmu.pdf, describes a recurrent neural network architecture that couples one or more layers implementing a linear time-invariant (LTI) dynamical system with one or more non-linear layers to process sequential input data. The weights governing this LTI system are analytically derived to compute an optimal delay of an input signal over some temporal window, and the non-linear components of the network read from the state of this system to compute arbitrary functions of the data in the input window. The resulting network is called a "Legendre memory unit" (LMU) due to how the LTI system represents data using a Legendre basis, and experimental evidence indicates that the LMU can efficiently handle temporal dependencies spanning hundreds of thousands of time-steps, greatly surpassing the capabilities of alternative recurrent network architectures. Overall, the LMU is an important example of a linear recurrent network with strong performance characteristics, but it is nonetheless limited by the sequential computation bottleneck that is typical of all recurrent architectures. This bottleneck restricts parallelization and limits the degree to which the LMU can be applied to very large scale datasets using GPU-based acceleration.

The methods and systems described in the aforementioned references and many similar references do not specify how to design recurrently connected artificial neural networks that can be parallelized during training and inference to avoid sequential computation bottlenecks that prohibit scaling up to massive training datasets. More specifically, the existing state-of-the-art provides little in the way of methods for parallelizing RNNs that perform linear transformations using dense weight matrices on their recurrent connections so as to implement particular kinds of LTI systems.

The present application addresses the above-mentioned concerns and shortcomings by defining methods and systems for improving the training and inference speed of recurrent neural networks by parallelizing the recurrent connections on network layers that implement linear time-invariant dynamical systems. More specifically, parallelization is performed by first computing the impulse response of an LTI network layer, and then convolving this impulse response with the parallelized sequence of network inputs. The outputs of the LTI layer for every timestep in the input sequence are thereby produced in one shot via a single, highly parallelized computational step. These outputs can then be used to perform additional computations involving other network layers, either to produce predictions during inference or loss metrics during training. Parallelizing RNNs in this way can lead to orders of magnitude improvements in training speed when using GPUs, which in turn enables these networks to be trained on massive datasets of the sort required to achieve breakthrough performance metrics on a range of sequence modelling tasks. Examples of such tasks include automatic speech recognition, machine translation, language modelling, sentiment analysis, and signal classification.

(3) SUMMARY OF THE INVENTION

In the view of the foregoing limitations inherent in the known methods for parallelizing recurrent neural networks, the present invention provides methods and systems for parallelizing the application of the recurrent connections of a linear network layer by computing the impulse response of the layer and then convolving this impulse response with all items in a layer's input sequence simultaneously. The outputs of the layer for every item in the input sequence are thereby computed in a single step, which allows for massive speedups when this computational step is parallelized across multiple cores on commodity GPU hardware. These outputs are then used to compute the responses of any additional layers in the network, which in turn are used to generate one or more network predictions during inference, or one or more loss metrics during training. In the case of training, the resulting loss metrics are used to compute gradients for the network's weights across all timesteps in parallel by backpropagating through the convolution used to compute the outputs of the recurrently connected linear layer. Finally, these gradients are used to update the network's weights so as to optimize performance with respect to some objective function of interest. As such, the general purpose of the present invention, which will be described subsequently in greater detail, is to provide methods and systems for improving the training and inference speed of a recurrent neural network model by parallelizing the application of its recurrent weights across all items in the network's input sequence.

The main aspect of the present invention is to define methods and systems for improving the training and inference speed of recurrently connected artificial neural network models. The methods consist of defining at least one linear recurrent layer, and at least one other layer that implements any nonlinear layer type, such as a perceptron layer, a self-attention layer, a convolutional layer, or a gated recurrent layer. The methods further consist of parallelizing the application of the linear recurrent layer to an input sequence by computing the impulse response of the layer and convolving this impulse response with all items in the layer's input sequence simultaneously to produce the layer's output sequence. The responses of the other network layers are then computed to generate either (a) output predictions, or (b) a loss metrics, in which case the loss is backpropagated through the convolution of the linear layer's impulse response with the input sequence to calculate parameter gradients across all network inputs in parallel; these parameter gradients are used to update the network's weights so as to minimize the loss metric, in keeping with standard model training techniques defined in the prior art. If the parameters of the recurrent or input matrices are altered, the impulse response is recomputed. The methods further comprise operating the recurrently connected artificial neural network with said parallelization to perform at least one pattern classification, signal processing, data representation, or data generation task.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

The invention will be better understood and objects other than those set forth above will become apparent when consideration is given to the following detailed description thereof. Such description makes reference to the annexed drawings wherein.

(5) DETAILED DESCRIPTION OF THE INVENTION

Figure 1:
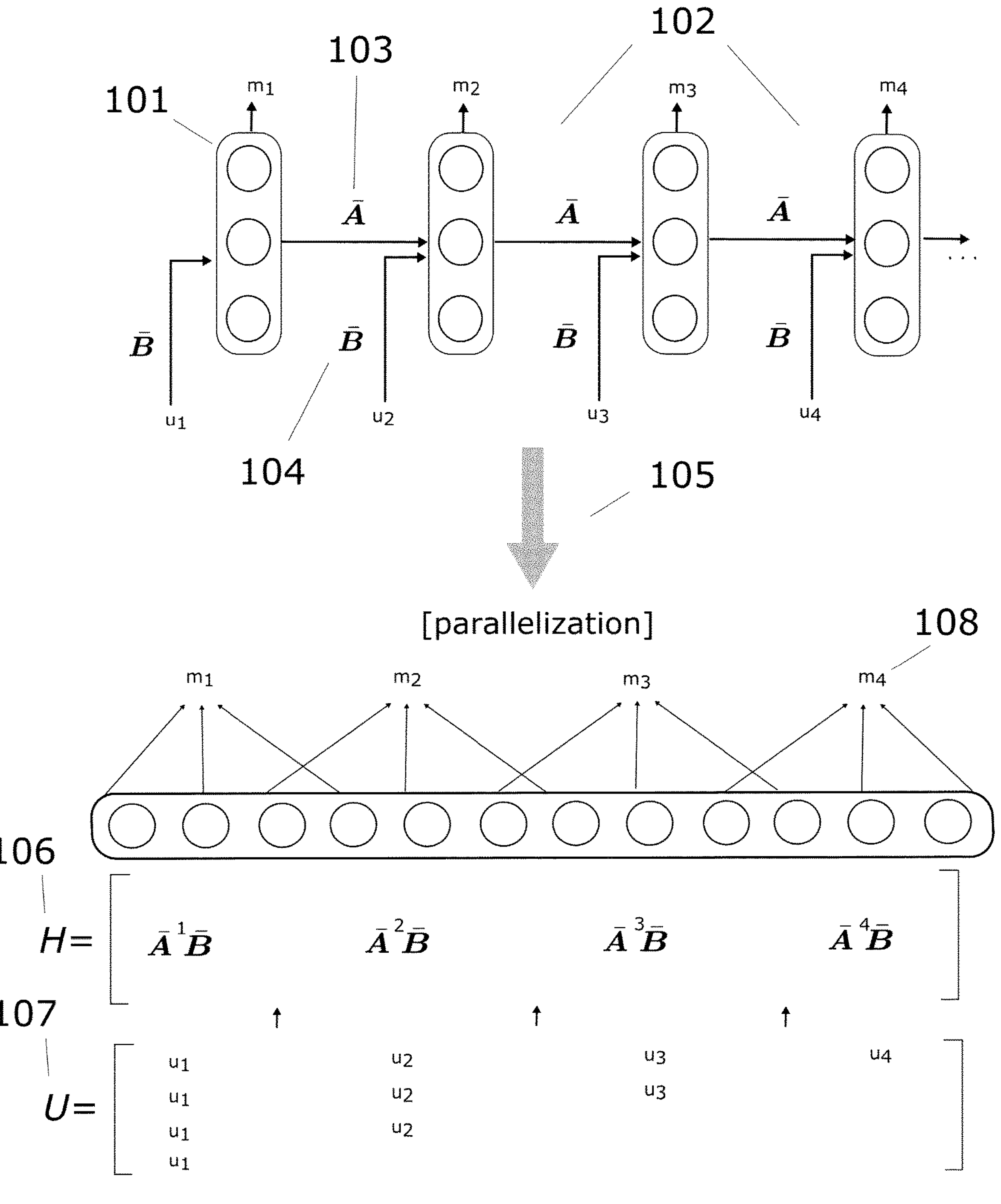
FIG. 1 is an illustration of the parallelization method that transforms a recurrently connected neural network layer into a feedforward neural network layer that computes exactly the same function.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the artificial neural networks described herein may be implemented in configurable hardware (i.e., an FPGA) or custom hardware (i.e., an ASIC), or a combination of both with at least one interface. The input signal is consumed by the digital circuits to perform the functions described herein and to generate the output signal. The output signal is provided to one or more adjacent or surrounding systems or devices in a known fashion.

As used herein the term 'node' in the context of an artificial neural network refers to a basic processing element that implements the functionality of a simulated 'neuron', which may be a spiking neuron, a continuous rate neuron, or an arbitrary linear or non-linear component used to make up a distributed system.

The described systems can be implemented using adaptive or non-adaptive components. The system can be efficiently implemented on a wide variety of distributed systems that include a large number of non-linear components whose individual outputs can be combined together to implement certain aspects of the system as will be described more fully herein below.

The main embodiment of the present invention is a set of systems and methods for improving the training and inference speed of recurrently connected artificial neural networks via a parallized application of one or more network layer's recurrent connection weights across all items in the layer's input sequence. The methods for carrying out this parallelization require that each such recurrent layer implements a linear time-invariant (LTI) dynamical system, and involve first computing the impulse response of a layer before convolving this impulse response with all items in the layer's input sequence, thereby producing all of the layer's outputs simultaneously. The responses of any additional network layers are then computed to generate either (a) output predictions, or (b) a loss metric, in which case the loss is backpropagated through the convolution of each LTI layer's impulse response with its input sequence so as to calculate parameter gradients across all layer inputs in parallel. These parameter gradients are used to update the network's weights so as to minimize the loss metric, in keeping with standard model training techniques defined in the prior art. However, the impulse response must be recomputed if the related parameters are updated, unless the impulse response has been fixed in advance. The methods further comprise operating the recurrently connected artificial neural network with said parallelization to perform at least one pattern classification, signal processing, data representation, or data generation task.

The term 'recurrent connection' here refers to a set of weighted connections that transfer the output of one or more nodes in a given network layer back as input to one or more nodes in the same layer. The term 'recurrently connected artificial neural network' refers to a neural network with one or more recurrent connections. Recurrent connections typically introduce a sequential bottleneck when computing layer output values from a sequence of inputs, since the activation values at a given point in the sequence depend on the values computed for all previous steps in the sequence. Alleviating this sequential bottleneck is necessary in order to fully take advantage of specialized hardware devices such as GPUs that accelerate neural network computations by parallelizing them across a large number of relatively simple processing elements.

The term 'activation function' here refers to any method or algorithm for applying a linear or nonlinear transformation to some input value to produce an output value in an artificial neural network. Examples of activation functions include the identity, rectified linear, leaky rectified linear, thresholded rectified linear, parametric rectified linear, sigmoid, tanh, softmax, log softmax, max pool, polynomial, sine, gamma, soft sign, heaviside, swish, exponential linear, scaled exponential linear, and gaussian error linear functions. The term "linear network layer" here refers to any layer in an artificial neural network that computes its output values using a linear activation function such as the identity function.

Activation functions may optionally output 'spikes' (i.e., one-bit events), 'multi-valued spikes' (i.e., multi-bit events with fixed or floating bit-widths), continuous quantities (i.e., floating-point values with some level of precision determined by the given computing system—typically 16, 32, or 64-bits), or complex values (i.e., a pair of floating point numbers representing rectangular or polar coordinates). These aforementioned functions are commonly referred to, by those of ordinary skill in the art, as 'spiking', 'multi-bit spiking', 'non-spiking', and 'complex-valued' neurons, respectively. When using spiking neurons, real and complex values may also be represented by one of any number of encoding and decoding schemes involving the relative timing of spikes, the frequency of spiking, and the phase of spiking. However, it will be understood by those of ordinary skill in the art that the embodiments described herein may be practiced without these specific details.

The term 'dynamical system' here refers to any system in which the system state can be characterized using a collection of numbers corresponding to a point in a geometrical space, and in which a function is defined that relates this system state to its own derivative with respect to time. In other words, a dynamical system comprises a state space along with a function that defines transitions between states over time. The term "linear time-invariant dynamical system" refers to a specific class of dynamical system for which the relationship between the system's input at a given time and its output is a linear mapping; moreover, this mapping is time invariant in the sense that a given input will be mapped to the same output regardless of the time at which the input is applied. LTI systems have the advantage of being relatively easy to analyze mathematically in comparison to more complex, nonlinear systems. In the context of the present invention, a particularly important form of mathematical analysis specifies how to write the state update equation for an LTI system in a non-sequential form.

The term 'impulse response' here refers to a mathematical description of an LTI system's output in response to an instantaneous input of unit magnitude. A dynamical system's impulse response more generally defines how it behaves as a function of time under specific input conditions. For any LTI system, the system's behavior is completely characterizable in terms of its impulse response, since an instantaneous pulse of unit magnitude comprises a combination of all possible input frequencies, and thereby stimulates the response of the system to all possible input frequencies. Due to the constraints of linearity and time invariance, the response thereby defines the behavior of the system exhaustively for all possible inputs over time.

The term 'convolution' here refers to the mathematical operation that takes two functions as input, and produces a third function as output that evaluates to the integral of the product of the two input functions over all possible shifts of one of the functions after it has been reversed. In many signal processing applications, the input functions are functions of time, and the integral is accordingly an integral over the products of these functions evaluated in the 'time-domain'. It is also possible to perform convolution when the functions are expressed as weighted combinations of more basic signal frequencies. With this 'frequency domain' representation of the input functions, convolution is defined simply as an element-wise product.

The term 'loss metric' here refers to a scalar output value that is to be minimized by the computations of an artificial neural network. Examples of loss metrics include mean-squared error (MSE), cross-entropy loss (categorical or binary), Kullback-Leibler divergence, cosine similarity, and hinge loss. A loss metric is computed using a loss function that produce the metrics from one or more inputs; these inputs may consist of externally supplied data, outputs computed by nodes in an artificial neural network, supervisory and reward signals, the state of a dynamical system, or any combination thereof.

The nonlinear components of the aforementioned systems can be implemented using a combination of adaptive and non-adaptive components. Examples of nonlinear components that can be used in various embodiments described herein include simulated/artificial neurons, FPGAs, GPUs, and other parallel computing systems. Components of the system may be implemented using a variety of standard techniques such as by using microcontrollers. In addition, non-linear components may be implemented in various forms including software simulations, hardware, or any neuronal fabric. Non-linear components may also be implemented using neuromorphic computing devices such as Neurogrid, SpiNNaker, Loihi, and TrueNorth.

As an illustrative embodiment of the proposed systems and methods, consider an LTI system presented in canonical form such that the input to the system, u, is mapped through a matrix B, while the system state is mapped through a recurrent matrix A at each timestep. The state of the system, m, at time t can then be described with the following convolution integral in the time domain:

(1)

$$m(t) = \int_0^t \exp(A(t-\tau))Bu(t)d\tau$$

where τ is a dummy variable ranging over all possible shifts with respect to t. To implement this integral in a discretized manner, the matrices A and B are discretized to A and B using Euler's method, Runge-Kutta methods, or any other known methods, to produce the following summation:

$$m(t) = \sum_{j=1}^{t} \underline{A}^{t-j}\underline{B}u_t \tag{2}$$

When a recurrent layer in an artificial neural network implements this LTI system under some choice of A and B, all of the layers outputs for a given input sequence can be computed in parallel due to the fact that the matrix powers in (2) can be precomputed once and stacked into a single matrix, $H=[\overline{A}^0\overline{B}\ \overline{AB} \ldots] \in \mathbb{R}^{d\times n}$, and multiplied by an upper triangular matrix containing all n items in the input sequence, defined as:

$$U = \begin{bmatrix} u_1 & u_2 & u_3 & \ldots & u_n \\ & u_1 & u_2 & \ldots & u_n - 1 \\ & & u_1 & \ldots & u_n - 2 \\ & & & \ddots & \vdots \\ & & & & u_1 \end{bmatrix} \in \mathbb{R}^{n\times n}, \tag{3}$$

The outputs of the LTI system up to n can then be computed in one highly parallelized step as $m_{l:n}=HU_{:n}$, where H is the system's impulse response, and U is its input. A more efficient way of computing these outputs can performed by mapping U and H to the frequency domain via the Fourier transform, F, and using element-wise multiplication to implement convolution as follows:

$$m_{1:n} = \mathcal{F}^{-1}\{\mathcal{F}\{H\}\cdot\mathcal{F}\{U_{:n}\}\}. \tag{4}$$

The outputs of the LTI system, min are thereby computed in a single step, offering the opportunity to parallelize the computations performed during this step using hardware devices such as GPUs.

Referring to FIG. 1, the sequence of inputs to the recurrent network layer [101] being parallelized would ordinarily be processed one after another, with a sequential bottleneck [102] occurring between the evaluation of m for successive layer inputs using the A [103] and B [104] matrices. By applying the methods disclosed herein [105], the impulse response H of this recurrent layer is computed [106], and the inputs to the layer are convolved with this impulse response in parallel [107] by performing either a matrix multiplication in the time domain or an element-wise multiplication in the Fourier domain, to produce the outputs $m_{l:n}$. [108] As shown in FIG. 1, applying these methods effectively transforms a sequentially bottle-necked recurrent neural network layer into a highly parallelized feedforward neural network layer. This feedforward layer performs exactly the same computations as its recurrent counterpart, but can be more easily implemented on commodity GPU hardware to accelerate the speed of these computations.

Figure 2:
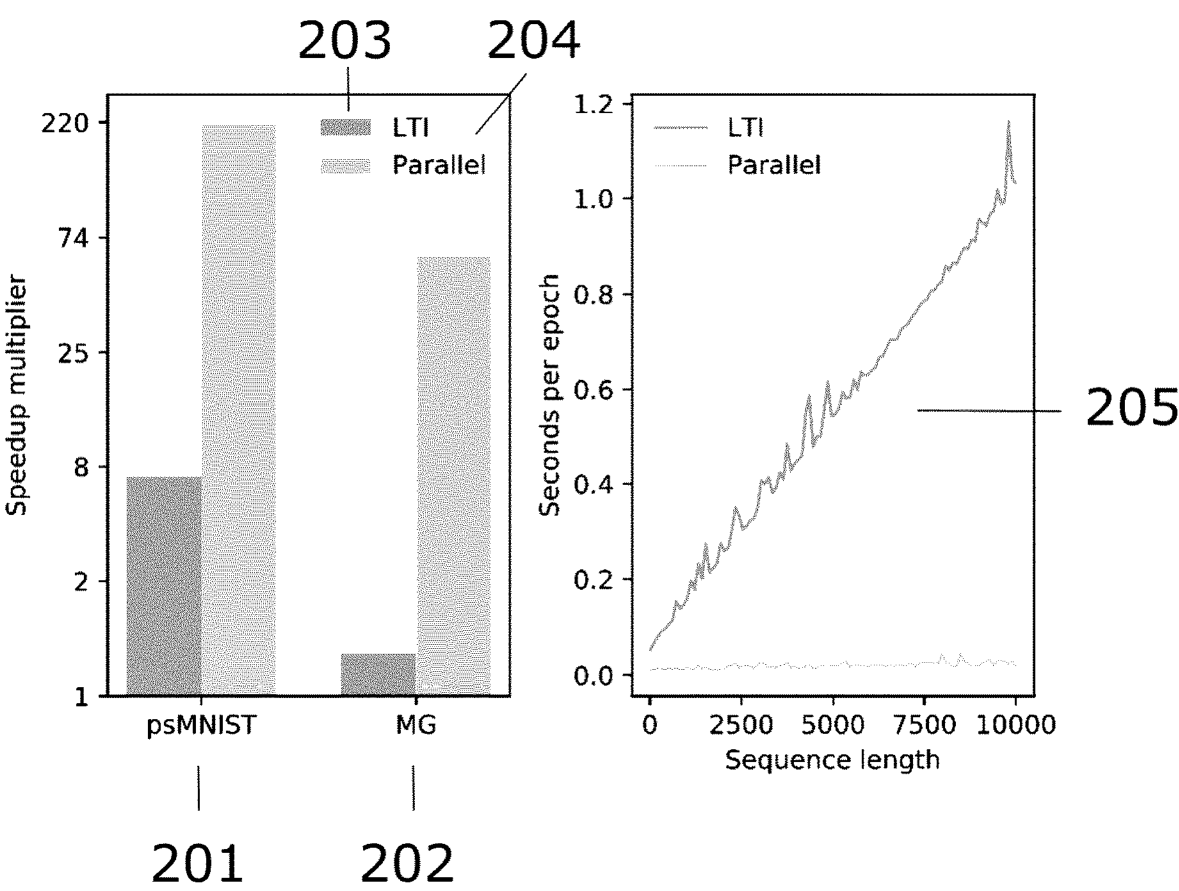
FIG. 2 is an illustration of the speed increases observed when parallelizing a recurrent neural model using the methods and systems described herein.

To provide a demonstration of the use of the methods and systems disclosed herein for parallelizing the computations performed by a recurrently connected artificial neural network, results from a number of benchmarking experiments are described herein. These experiments used the A and B matrices from the LTI component of the Legendre Memory Unit. However, many standard linear transforms and their variants can be employed similarly, including the Fourier Transform, Hadamard Transform, Haar Transform, Laplace Transform, Cosine Transform, Fourier-Stieltjes, Gelfand Transform, or Hartley Transform. Windowed versions of these transforms may also be similarly employed and may have different A and B matrices. Referring to FIG. 2, the methods and systems for parallelizing recurrent neural network layers were evaluated on two standard machine learning benchmarks for sequence modelling: the psMNIST sequence classification task [201], and the Mackey-Glass sequence prediction task.

The speed of a standard recurrent neural network model is compared to a model in which the recurrent layers correspond to LTI systems [203], and in which these LTI layers are parallelized [204]. Increasing the length of the sequences over which the speed metrics are calculated indicates that these methods for parallelizing recurrent neural network layers can provide up to a 200$x$ increase in computation speed [205]. All results were measured using a single GTX 1080 GPU device.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The invention claimed is:

1. A computer implemented method for improving training speed of a recurrently connected artificial neural network, the method comprising:

defining a linear recurrent layer of the artificial neural network with input of one or more dimensions;

defining at least one other layer that implements a nonlinear layer type;

parallelizing the application of each linear recurrent layer to an input sequence of the linear recurrent layer by:

computing an impulse response of the linear recurrent layer;

convolving the impulse response with all items in the input sequence simultaneously to produce an output sequence of the linear recurrent layer;

computing responses of the at least one other layer using the output sequence;

computing a loss metric from the response of a last network layer of the at least one other layer, computing parameter gradients across the input sequence in parallel by backpropagating the loss metric through a convolution of the impulse response with the input sequence; and updating unfixed weights of the artificial neural network using the parameter gradients to minimize the loss metric;

wherein the artificial neural network is operable to perform at least one of a pattern classification, signal processing, data representation, or data generation task.

2. The method of claim 1, wherein computations performed by the linear recurrent layer are expressed as a convolution in the time domain.

3. The method of claim 1, wherein computations performed by the linear recurrent layer are expressed as an element-wise multiplication in the frequency domain.

4. The method of claim 1, wherein the parallelizing is implemented as a matrix-matrix product between the impulse response of the linear recurrent layer and an upper-triangular matrix that includes all intermediate input sequences up to a full input sequence.

5. The method of claim 1, wherein an input to the artificial neural network is provided by using previous outputs from another artificial neural network.

6. The method of claim 1, wherein training of the artificial neural network is run with parallelization and inference by the artificial neural network is run without parallelization.

7. The method of claim 1 wherein the linear recurrent layer comprises a fixed linear discrete or continuous transform.

8. The method of claim 7 wherein the transform is selected from the group consisting of discrete or continuous Legendre Transform, Fourier Transform, Hadamard Transform, Haar Transform, Laplace Transform, Cosine Transform, Fourier-Stieltjes Transform, Gelfand Transform, and Hartley Transform.

9. The method of claim 8 wherein the linear recurrent layer comprises a windowed version of the transform.

10. The method of claim 1 wherein the artificial neural network comprises a plurality of linear recurrent layers.

11. The method of claim 10 wherein the artificial neural network comprises at least one other layer that implements a nonlinear layer type for each linear recurrent layer.

12. A data processing system, comprising circuitry configured to improve training speed of a recurrently connected artificial neural network by:

defining a linear recurrent layer of the artificial neural network with input of one or more dimensions;

defining at least one other layer that implements a nonlinear layer type;

parallelizing the application of each linear recurrent layer to an input sequence of the linear recurrent layer by:

computing an impulse response of the linear recurrent layer;

convolving the impulse response with all items in the input sequence simultaneously to produce an output sequence of the linear recurrent layer;

computing responses of the at least one other layer using the output sequence;

computing a loss metric from the response of a last network layer of the at least one other layer;

computing parameter gradients across the input sequence in parallel by backpropagating the loss metric through a convolution of the impulse response with the input sequence; and updating unfixed weights of the artificial neural network using the parameter gradients to minimize the loss metric;

wherein the artificial neural network is operable to perform at least one of a pattern classification, signal processing, data representation, or data generation task.

13. The data processing system of claim 12, wherein computations performed by the linear recurrent layer are expressed as a convolution in the time domain or are expressed as an element-wise multiplication in the frequency domain.

14. The data processing system of claim 12, wherein the parallelizing is implemented as a matrix-matrix product between the impulse response of the linear recurrent layer and an upper-triangular matrix that includes all intermediate input sequences up to a full input sequence.

15. The data processing system of claim 12, wherein an input to the artificial neural network is provided by using previous outputs from another artificial neural network.

16. The data processing system of claim 12, wherein the linear recurrent layer comprises a fixed linear discrete or continuous transform.

17. The data processing system of claim 16, wherein the transform is selected from the group consisting of discrete or continuous Legendre Transform, Fourier Transform, Hadamard Transform, Haar Transform, Laplace Transform, Cosine Transform, Fourier-Stieltjes Transform, Gelfand Transform, and Hartley Transform.

18. The data processing system of claim 17, wherein the linear recurrent layer comprises a windowed version of the transform.

19. The data processing system of claim 12 wherein the artificial neural network comprises a plurality of linear recurrent layers.

20. The data processing system of claim 12 wherein the artificial neural network comprises at least one other layer that implements a nonlinear layer type for each linear recurrent layer.

* * * * *